US011871500B2

(12) United States Patent
Frank et al.

(10) Patent No.: US 11,871,500 B2
(45) Date of Patent: Jan. 9, 2024

(54) METHOD FOR HEATING A COOKING VESSEL ON A HOB, AND HOB

(71) Applicant: E.G.O. Elektro-Geraetebau GmbH, Oberderdingen (DE)

(72) Inventors: Marcus Frank, Sulzfeld (DE); Marius Lehner, Muehlacker (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 179 days.

(21) Appl. No.: 17/209,544

(22) Filed: Mar. 23, 2021

(65) Prior Publication Data

US 2021/0315069 A1 Oct. 7, 2021

(30) Foreign Application Priority Data

Apr. 1, 2020 (DE) ..................... 10 2020 204 252.7

(51) Int. Cl.
*H05B 6/12* (2006.01)

(52) U.S. Cl.
CPC .................................. *H05B 6/1281* (2013.01)

(58) Field of Classification Search
CPC .......... H05B 6/1281; H05B 6/06; H05B 6/12; H05B 1/0266; H05B 2213/05; H05B 2213/06; H05B 2213/07; H05B 6/062; H05B 6/065; H05B 6/1209; H05B 6/1236; F24C 7/083; F24C 15/105
USPC ......................... 219/620–622, 625–627, 224
See application file for complete search history.

(56) References Cited

U.S. PATENT DOCUMENTS

2016/0073820 A1* 3/2016 Alet Vidal ............. H05B 3/746 99/341
2016/0095169 A1* 3/2016 Sanchez ............... H05B 6/1209 219/622
2019/0162418 A1 5/2019 Egenter et al.
2020/0196399 A1 6/2020 Egenter et al.
(Continued)

FOREIGN PATENT DOCUMENTS

DE 102009029253 A1 3/2011
DE 102012200294 * 7/2013
DE 102012200294 A1 7/2013
(Continued)

OTHER PUBLICATIONS

English translation to DE102012200294 (Year: 2013).*
(Continued)

*Primary Examiner* — Tu B Hoang
*Assistant Examiner* — Bonita Khlok
(74) *Attorney, Agent, or Firm* — Alston & Bird LLP

(57) ABSTRACT

A method for heating a cooking vessel on a hob with a plurality of heating devices is described. Each heating device has a heating region in which a cooking vessel can be arranged in order to be heated by the heating device under the control of a power supply. The cooking vessel has a temperature sensor together with an evaluation apparatus and a transmitting apparatus for transmitting an identification and temperature data. A controller controls the heating device in a specific manner and evaluates the received temperature data using a plurality of plausibility checks in order to determine whether said data match the operation of the heating device. If these plausibility checks are passed, the cooking vessel is assigned to the heating device.

22 Claims, 2 Drawing Sheets

(56) References Cited

U.S. PATENT DOCUMENTS

| | | | | |
|---|---|---|---|---|
| 2022/0210874 A1 * | 6/2022 | Kikuchi | .................. | H05B 3/68 |

FOREIGN PATENT DOCUMENTS

| | | |
|---|---|---|
| DE | 102017220814 A1 | 5/2019 |
| DE | 102018119953 A1 | 2/2020 |

OTHER PUBLICATIONS

German Patent and Trade Mark Office, Office Action received for Application No. 102020204252.7, dated Jan. 19, 2021, 11 pages, Germany.

European Patent Office, Search Report received for Application No. EP 21163648.5, dated Aug. 30, 2021, 5 pages, Germany.

* cited by examiner

METHOD FOR HEATING A COOKING VESSEL ON A HOB, AND HOB

CROSS-REFERENCE TO RELATED APPLICATIONS

This application claims priority to German Application No. 10 2020 204 252.7, filed Apr. 1, 2020, the contents of which are hereby incorporated herein in its entirety by reference.

FIELD OF APPLICATION AND PRIOR ART

The invention relates to a method for heating a cooking vessel on a hob, said hob having a plurality of heating devices, and also relates to an accordingly designed hob.

US 2020/0196399 A1 discloses the practice of assigning so-called smart cooking vessels on a hob to a cooking zone or to an induction heating device. For this purpose, the smart cooking vessels are intended to be reliably recognized by virtue of the induction heating device generating energy in a particular pattern or with particular coding and this coding being recognized at the cooking vessel. Corresponding data, together with an identification, are transmitted from the cooking vessel to a controller of the hob and this cooking vessel is assigned to this induction heating device if this corresponds to the generation of energy at the induction heating device.

Object and Achievement

The invention is based on the object of providing a method mentioned at the outset for heating a cooking vessel on a hob and of providing a hob mentioned at the outset, with which problems in the prior art can be solved and it is possible, in particular, to be able to heat a cooking vessel well and, in particular, to be able to heat a so-called smart cooking vessel having a temperature sensor together with an evaluation apparatus and a transmitting apparatus for transmitting an identification and temperature data.

This object is achieved by means of a method and a hob, each as set forth in the claims included herein. Advantageous and preferred configurations of the invention are the subject matter of the further claims and are explained in more detail below. In this case, some of the features are described only for the method or only for the hob. However, irrespective of this, they are intended to be able to apply both to a method and to a hob autonomously and independently of one another.

In the method, provision is made for each heating device to have a heating region or a cooking zone, in particular the area above it, and for a cooking vessel to be able to be arranged on the hob so as to cover this heating region. In this case, each heating device is designed to generate and transmit energy for heating a cooking vessel arranged above it and for this purpose is controlled by a power supply. A heating device may consist of a plurality of individual heating elements or may have a plurality of individual heating elements, for example in the form of twin-ring heating or inductive surface cooking. Although they can be operated individually in principle, they are advantageously operated together, as a single element, for the method according to the invention. The heating device may be, for example, a radiation heating device which is directly connected to mains voltage and is operated with clocking using relays, or an induction heating coil which is controlled by power electronics with a variable power level. Provision may also be made for a plurality of these radiation heating devices or a plurality of these induction heating coils to respectively form, as heating elements, a heating device according to the invention. The cooking vessel has a temperature sensor together with an evaluation apparatus, which can be used to detect a temperature or a temperature change at the cooking vessel. In this case, the heating region of the heating device is at least partially covered by the cooking vessel. For this purpose, the temperature sensor may be arranged at a favorable position on the cooking vessel, for example on the base of the cooking vessel or inside the cooking vessel. It captures a temperature or a temperature change on account of the heating. A transmitting apparatus is also provided for the purpose of transmitting a unique identification of the cooking vessel and temperature data from the temperature sensor on the basis of the received energy from the heating device in the form of a temperature increase at the temperature sensor. This identification of the cooking vessel may be unique and may be allocated only for a single cooking vessel.

A receiving device is provided for the hob for the purpose of receiving the identification and the temperature data from the transmitting apparatus of a cooking vessel or from all transmitting apparatuses of cooking vessels on the hob or in the receiving region of the receiving device, that is to say possibly also on a work surface beside the hob or in a cupboard underneath. A controller is provided for the hob, which controller receives the identification and the temperature data from the receiving device and evaluates them with respect to information relating to transmission of energy from the heating device. The controller therefore knows which temperature data and therefore which temperature change take(s) place or has/have taken place at which cooking vessel and it also knows this cooking vessel on account of the specific identification and can therefore distinguish it from other cooking vessels.

The method has the steps mentioned below. First of all, at least one above-mentioned cooking vessel, that is to say a cooking vessel having a temperature sensor together with an evaluation apparatus and a transmitting apparatus, is arranged above a heating region of a heating device. At least this heating device is controlled by the power supply, advantageously by means of so-called energy data, in order to generate and transmit energy to the cooking vessel in a cycle. The duration and/or maximum value of the transmission of energy is/are varied within this cycle. The variation in a cycle involves the maximum value of the transmitted energy varying over time, and/or the duration of the transmission of energy varying, and/or the duration between two operations of transmitting energy varying, and/or the number of operations of transmitting energy varying. A plurality of the above-mentioned options advantageously vary.

The temperature sensor of the cooking vessel registers a change or an increase in the temperature on account of the transmission of energy after the start of operation of the heating device or the generation of energy. The evaluation apparatus of the cooking vessel, preferably of each cooking vessel, evaluates the change or temporal profile of the temperature as temperature data and transmits the identification of this cooking vessel and these temperature data to the receiving device by means of the transmitting apparatus. The receiving device receives the transmitted identification and temperature data, preferably all identifications and temperature data which are received from cooking vessels, and forwards them to the controller. The controller in turn calculates, preferably at the end of each cycle or after each cycle, a relationship, in particular for the sake of simplicity the ratio or the quotient, of the energy generated by the heating device with respect to the resulting temperature difference or temperature increase at the temperature sensor, which forms a first plausibility result. The controller also calculates a relationship, in particular for the sake of simplicity the ratio, of the first temporal derivative of the energy generated by the heating device with respect to the maximum first temporal derivative of the temperature at the temperature sensor, which forms a second plausibility result. The respective instantaneous values are advantageously taken after a process of generating energy at the heating device, that is to say when energy is no longer generated. In particular, the ratio, that is to say the value for the energy divided by the value for the temperature, is taken when respectively calculating the relationships for the plausibility result. These first and second plausibility results are buffered by the controller. After each cycle, the change in the absolute temperature at the temperature sensor is checked for the received temperature data and this change is buffered by the controller as a third plausibility result.

This cycle of generating and transmitting energy is carried out at least twice, advantageously precisely three times, in the same manner, wherein the three plausibility results are each calculated and buffered during and after each carrying-out operation. The controller then carries out a plausibility check for each of the three plausibility results, and a check is carried out during the plausibility check in order to determine whether the respective plausibility result is in a plausibility range predefined for this plausibility result and stored in the controller. This plausibility range is extended such that a plausibility result is in said range only, but certainly, when the cooking vessel is arranged above the heating device.

If all three plausibility checks were positive, the cooking vessel with this identification is assigned to this heating device which previously generated and transmitted the energy. The change in the temperature at the cooking vessel which has been captured by the temperature sensor therefore matches the generation of energy at this heating device. However, if at least one plausibility check was negative, the cooking vessel with this identification is not assigned to this heating device and, in particular, is not assigned to any heating device. A fault message may be output on the hob. The reason may be that a cooking vessel has been captured or its signals have been captured, but it was not arranged above the heating device.

These steps are carried out as a check for all identifications and temperature data of cooking vessels having a temperature sensor, an evaluation apparatus and a transmitting apparatus that are received by the receiving device. If no check of temperature data of a cooking vessel was positive in all three plausibility checks during the at least two cycles, the controller assumes that, although a cooking vessel having a temperature sensor together with an evaluation apparatus and a transmitting apparatus has been placed on the hob or in the vicinity, it has not been placed on the heating device itself for which and with which the check has been carried out. If only precisely one single check of temperature data of a cooking vessel was positive in all three plausibility checks during the at least two cycles, precisely one single cooking vessel having a temperature sensor together with an evaluation apparatus and a transmitting apparatus on the hob is assumed, to be precise also precisely on the heating device itself for which and with which the check has been carried out. This is a desired result and this cooking vessel can then be heated on this heating device with temperature capture and an automatic program, for example. The other possible cases are also described as options below.

The invention therefore makes it possible to detect so-called smart cooking vessels having a temperature sensor on a suitable hob, to assign them to a heating device and to then heat them, wherein temperature control is possible during heating, preferably for an automatic program. Such automatic programs with such cooking vessels having a temperature sensor are known from the prior art; see US 2020/0196399 A1 mentioned at the outset and also US 2016/0095169 A1.

In one configuration of the invention, if a plurality of checks of temperature data of a cooking vessel were positive in all of the three plausibility checks mentioned during the at least two cycles, a check can be carried out in order to determine whether the temperature data have been received from different cooking vessels with different identifications. A cooking vessel is not assigned to a heating device in this case since this plurality of different cooking vessels are probably on the same heating device or overlap above said heating device, as a result of which an automatic program cannot be carried out on this heating device. If the temperature data have been received from a single cooking vessel with a single identification, this cooking vessel is assigned to the heating device. This is the desired case for carrying out an automatic program.

In a further configuration of the invention, if only one single check of temperature data of a cooking vessel was positive in all three plausibility checks during the at least two cycles or during all cycles which have been carried out, but the associated cooking vessel has already been assigned to another heating device, a new assignment of this cooking vessel is not carried out. It is then possibly still above the other heating device, but this assignment must be deleted. The result is not plausible and possibly arises because the cooking vessel has been shifted during the plausibility check, but this has not been registered by the hob.

In yet another configuration of the invention, if a plurality of checks of temperature data were positive in all three plausibility checks during the at least two cycles, the cooking vessel whose temperature data have been checked and for which the plausibility checks were positive but which has already been assigned to a heating device other than that which generated and transmitted the energy, a fault is detected. Each assignment of a cooking vessel to a heating device in the hob can then be deleted since a more significant fault is obviously present and has been detected. Provision may also be made for a plurality of cooking vessels and their temperature data to be checked, but the check was positive only for one cooking vessel. Only this cooking vessel is then also assigned to the corresponding heating device.

Provision may be made, on the one hand, for the method to be simultaneously carried out only with a single heating device of the hob, wherein, although other heating devices of the hob are preferably operated for the purpose of generating and transmitting energy, they are not operated according to an above-mentioned cycle. The intention is therefore to search for smart cooking vessels placed above only this heating device.

Provision may be made, on the other hand, for the method to be simultaneously carried out with at least two heating devices of the hob, in particular even for all heating devices of the hob. In this case, the generation and transmission of energy in the at least two heating devices is different with respect to at least one of the above-mentioned variations of maximum value, transmission duration, duration between two operations or the number of operations. The at least two heating devices are therefore operated differently, with the result that the heating device can be unambiguously inferred from the temperature data which are sent back.

In addition to the transmitting apparatus, the cooking vessel also advantageously has an integrated circuit, in particular in the form of an evaluation apparatus, preferably a microcontroller. An energy store such as a battery, a rechargeable battery or a capacitor, that is to say a replaceable or rechargeable energy store, can also be provided.

The heating device is preferably controlled by the power supply in such a manner that a special pattern which is not used by an operator during normal operation is generated. A random confirmation at a heating device or a cooking vessel can therefore be avoided. Energy with more than 30% of the maximum energy which can be permanently generated can be advantageously generated and transmitted as high energy by the heating device at least twice, preferably three times, in a cycle mentioned. As a result, a temperature change at the cooking vessel, which can be clearly captured by the temperature sensor, can also be effected in a relatively short time, for example less than 30 seconds. Between each process of generating high energy, the heating device can be controlled in such a manner that only low energy with less than 15% of the maximum energy which can be permanently generated is generated. Alternatively, provision may also be made here for the heating device to remain switched off in between. The important factor here is as it were the difference between generated high energy and generated low energy.

The generation of high energy with more than 30% of the maximum energy which can be permanently generated can respectively increase, preferably by 20% to 50% in each case, after generation of lower energy in a cycle mentioned. High or very high energy can therefore be generated twice or three times for an above-mentioned period and no energy or only low energy can be generated in between. This pattern is then very characteristic and unique and therefore cannot be confused with normal operation. At the same time, it ensures temperature changes which can be unambiguously detected multiple times and can be captured using the temperature sensor.

A duration of generating high or very high energy may be 5 seconds to 30 seconds, preferably 10 seconds to 20 seconds. This suffices to heat even heavy cooking vessels with a high thermal capacity and to change their temperature in an unambiguously detectable manner.

A duration of generating low energy may be 10 seconds to 40 seconds, preferably 15 seconds to 25 seconds. This suffices not only to cause no further increase in the temperature but generally even a slight decrease even for the above-mentioned cooking vessels. This again improves the detectability and unambiguity.

A duration of generating high energy may be approximately identical, preferably exactly identical, in each cycle. This can also apply to a duration of generating low energy in each cycle.

A duration of generating low energy in each cycle is preferably longer than a duration of generating high energy, preferably even 30% to 100% longer. This ensures the above-mentioned temperature decrease during this time.

A duration of an entire cycle may be 40 seconds to 240 seconds, preferably 70 seconds to 110 seconds. This then requires a certain time overall for running through the cycle twice or three times, but the assignment of a smart cooking vessel to a heating device is then reliable and unique.

In one configuration of the invention, each cycle may be identical to the other cycle; in particular, only a single type of cycle may be provided. In this case, the identity of the cycle may also apply to heating devices with a different absolute maximum energy which can be permanently generated by virtue of the heating devices generating energy with the same energy density in each case as energy per unit area of the heating device. There is thus also a certain comparability.

In one development of the invention, the method can be carried out on a mobile terminal or an external control device with a controller or an evaluation apparatus and a receiving device if an app on the mobile terminal is active or if the external control device is activated. In this case, the mobile terminal or external control device is connected to the hob for the purpose of controlling the hob and the power supply of the heating device.

The transmitting apparatus on the cooking vessel may be selected from the group: Bluetooth, BLE, Zigbee, NFC, WiFi. BLE is appropriate, in particular, since the energy consumption is low and the conventional range of BLE suffices for this application.

The method can be advantageously carried out only on those heating devices of the hob whose heating region is assigned to only precisely one cooking vessel or on which only a single cooking vessel can be placed. In addition, heating devices which are provided solely for heating a cooking vessel are particularly advantageous. The generation of the specific pattern of energy and the detection at a cooking vessel are then easier and more reliable.

The hob according to the invention is designed to carry out the above-mentioned method, wherein the hob preferably has a plurality of induction heating coils as heating elements which can each individually form a heating device or can together form a heating device. In this case, at least one heating region, advantageously precisely one heating region, is assigned to each induction heating coil or each group of induction heating coils.

These and further features emerge not only from the claims but also from the description and the drawings, wherein the individual features can each be implemented alone or together in the form of a subcombination in one embodiment of the invention and in other fields and may represent advantageous and inherently protectable embodiments, for which protection is claimed here. The subdivision of the application into individual sections and subheadings does not restrict the generality of the statements made thereunder.

BRIEF DESCRIPTION OF THE DRAWINGS

Further advantages and aspects of the invention emerge from the claims and from the following description of preferred exemplary embodiments of the invention which are explained below on the basis of the figures, in which:

DETAILED DESCRIPTION OF THE EXEMPLARY EMBODIMENTS

Figure 1:
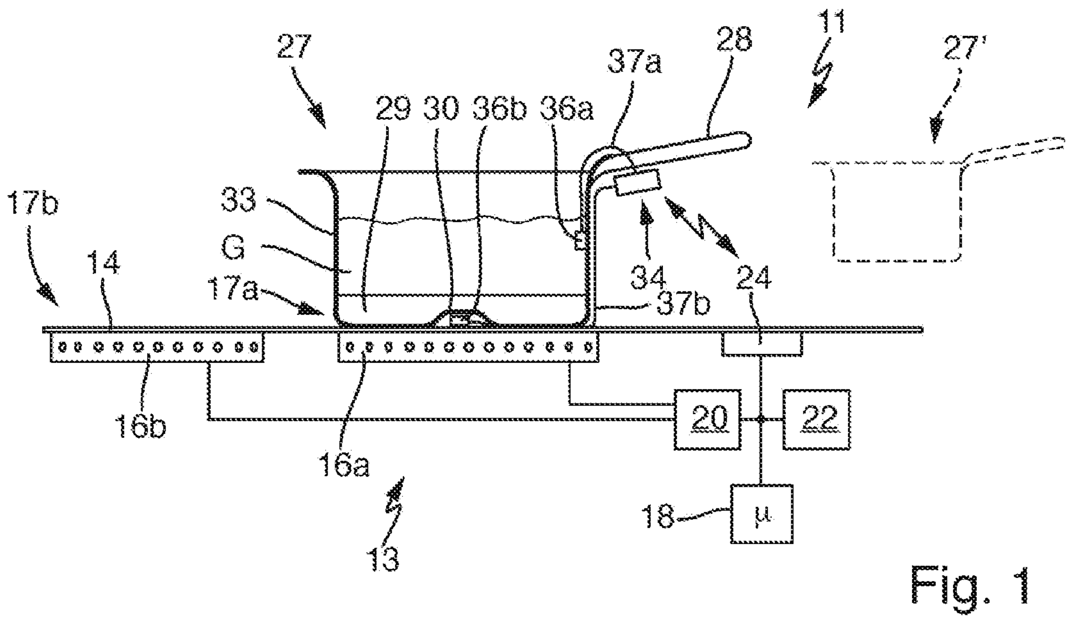
FIG. 1 shows a schematic illustration of a system having an induction hob according to the invention and having a cooking vessel placed onto a heating region of an induction heating coil.

FIG. 1 illustrates a system 11 according to the invention having an induction hob 13 according to the invention and a cooking vessel 27. The induction hob 13 has a hob plate 14, below which two induction heating coils 16*a* and 16*b* are arranged at a certain distance by way of example. In practice, there are advantageously more induction heating coils 16, for example four or six or eight or even up to twenty or thirty induction heating coils in so-called flat-surface hobs. The induction heating coils may each individually form an above-mentioned heating device or may together form a heating device. In this case, at least one heating region is assigned to each induction heating coil or each group of induction heating coils, which heating regions are also called cooking zones.

The induction hob 13 also has a hob controller 18 which is connected to a power supply 20, a receiving device 22 for wireless communication and an operating device 24 on the underside of the hob plate 14. These functional units are each designed in a conventional manner. The power supply advantageously has circuit breakers in a conventional connection, in particular depending on the type of heating devices. Electrical circuit breakers or power electronics are provided here for the induction heating coils 16. If the heating devices are formed by conventional radiation heating devices, conventional relays can be used here. The operating device 24 has operating elements, preferably in the form of contact switches, and advantageously optical indicating means such as light indicators and/or displays and also acoustic indicating means such as a buzzer or a beeper. A radio standard for the receiving device 22 may have various designs in principle, as explained at the outset. It is advantageously selected from the possibilities of Bluetooth or BLE or Zigbee, WLAN or the like, as well as proprietary solutions without a generally valid standard.

A cooking zone 17*a* and 17*b* is respectively formed above the induction heating coils 16*a* and 16*b* and has an area which respectively corresponds approximately to the area of the induction heating coils 16. A cooking vessel 27 according to the invention having a cooking vessel base 29 and a cooking vessel wall 33 and a handle 28 is arranged on the right-hand cooking zone 17*a* and is placed there onto the top of the hob plate 14. General goods to be cooked G, for example water or liquid goods to be cooked, are situated in the cooking vessel. The cooking vessel 27 has an above-mentioned temperature sensor 36*b* in a recess 30 of the cooking vessel base 29. The temperature sensor 36*b* is designed in a conventional manner, in particular is also sufficiently temperature-stable, for example in the form of a PT100 or PT1000. The temperature sensor 36*b* captures the temperature of the cooking vessel base 29. This is important for the above-described temperature capture and capture of a temperature of the cooking vessel base 29 and its change. This temperature of the cooking vessel base 29 changes during operation of the induction coil 16*a* and, in particular, increases if the induction coil 16*a* generates power or energy and transmits it to the cooking vessel 27 or to the cooking vessel base 29. The temperature sensor 36*b* is connected, by means of a connection cable 37*b*, to a cooking vessel module 34 which is illustrated in enlarged form in FIG. 2 and is also explained in detail below. The cooking vessel module 34 is in wireless communication with or has a radio connection to the receiving device 22 in the induction hob 13.

Furthermore, the cooking vessel module 34 may be alternatively or additionally connected, by means of a connection cable 37*a*, to a temperature sensor 36*a* which is arranged inside the cooking vessel 27, advantageously on the inside of the cooking vessel wall 33. This temperature sensor 36*a* can directly capture, in particular, the temperature of the goods to be cooked G, which may be advantageous for the automatic programs mentioned at the outset. Under certain circumstances, the temperature of the goods to be cooked G can be used even better for an automatic program than the temperature of the cooking vessel base 29 that can be captured by the temperature sensor 36*b*. Finally, the goods to be cooked G are intended to be cooked. This temperature sensor 36*a* could also be arranged at an even lower level and could therefore be arranged even closer to the cooking vessel base 29.

A further cooking vessel 27' is illustrated using dashed lines on the right close to the induction hob 13 and is intended to be designed like the cooking vessel 27 described above. However, this cooking vessel 27' illustrated using dashed lines is not only not arranged above the same induction coil 16*a*, but rather is not arranged on the induction hob 13 at all. It is therefore not heated by an induction heating coil 16 of the induction hob 13 and can also not be heated at all. However, it is arranged close to the receiving device 22 such that the latter also receives signals and therefore temperature data from this cooking vessel 27'. However, these temperature data indicate a substantially constant temperature since this cooking vessel 27' is not heated at all and therefore its temperature actually does not change or at least does not change significantly. This cooking vessel 27' is intended to illustrate, as also explained below, that it is important to distinguish between different cooking vessels, which can be carried out particularly well with the invention.

Figure 2:
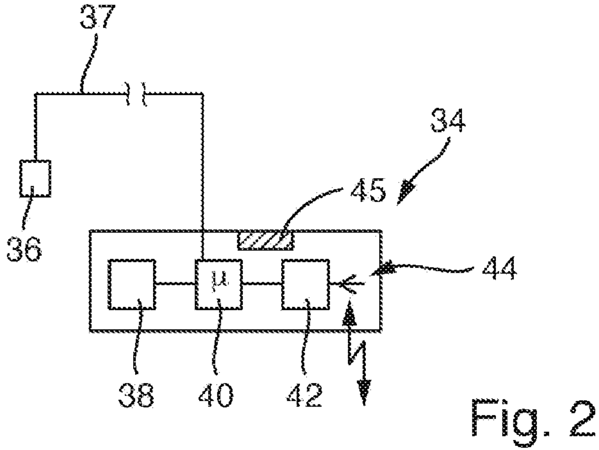
FIG. 2 shows a simplified illustration of the functionalities of the cooking vessel having temperature sensors, an evaluation apparatus and a transmitting apparatus.

FIG. 2 illustrates the cooking vessel module 34 in enlarged form. The cooking vessel module 34 is connected, by means of the connection cable 37, to the temperature sensor 36 which may be one of the temperature sensors 36*b* and 36*a*. In addition to one or two temperature sensors, further sensors such as pressure sensors, weight sensors or the like may also be provided.

The cooking vessel module 34 also has an energy store 38 which may be a rechargeable battery and must not be able to store particularly large amounts of energy, in particular if transmission is carried out using Bluetooth or BLE or Zigbee but this should be as quick and loss-free as possible. An integrated circuit is also provided in the cooking vessel module 34 as an evaluation apparatus 40, advantageously as a microcontroller. The evaluation apparatus 40 controls a transmitting apparatus 42 of the cooking vessel 27 having a transmitting antenna 44, advantageously designed for the above-mentioned Bluetooth or BLE standard or Zigbee. The transmitting apparatus 42 is therefore in the above-mentioned wireless communication with or has a radio connection to the receiving device 22. An individual or special and unique identification of the cooking vessel 27 and the respective temperature data from at least one of the temperature sensors 36*b* or 36*a* are therefore transmitted to the receiving device 22.

The cooking vessel module 34 may be magnetically fitted, by means of a magnet 45, to the handle 28, for example on the underside close to the cooking vessel wall 33. As a result, the functionality of the handle 28 is impaired as little as possible. As an alternative to magnetic fastening, a permanent connection may be provided. As yet another alternative, fastening to the handle 28 may be carried out using a type of clip or belt. The cooking vessel module 34 together with the temperature sensor 36*a* can be advantageously removed from the cooking vessel 27 in a simple and particularly advantageous manner without a tool. An electrical connection to the temperature sensor 36*b* permanently arranged in the cooking vessel base 29 could be designed to be disconnectable by means of a plug-in connection. As a result of the cooking vessel module 34, the cooking vessel 27 is an above-described smart cooking vessel.

Figure 3:
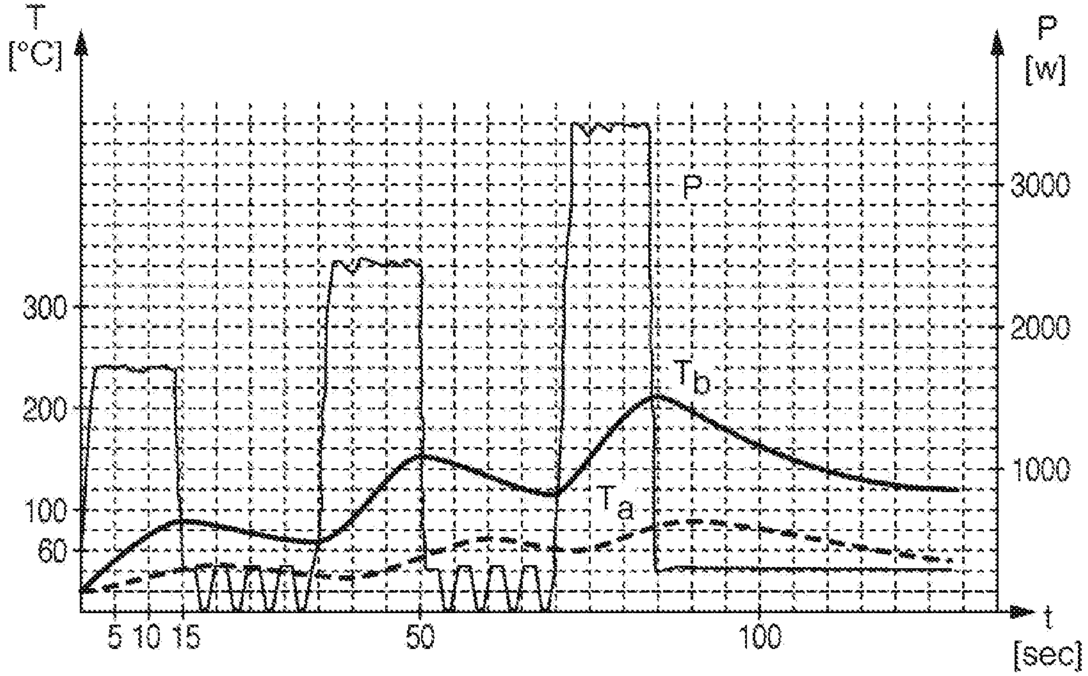
FIG. 3 shows a pattern for generating power at the induction heating coil for the purpose of generating energy.

FIG. 3 illustrates an example of a particular predefined temporal pattern for power generation or energy generation for the induction heating coil 16*a* alone. The induction coil 16*b* could also be operated in a similar form in order to capture whether a smart cooking vessel 27 is arranged above it. At the time t=0, the induction heating coil 16*a* is controlled by the power supply 20 at a significant or medium-high power of P=1750 W. This is carried out in the form of a long pulse for 15 seconds. The power then falls greatly and is pulsed with only a low level, here varying between 0 W and 300 W, for instance. This forms a type of extensive pause in the generation of energy.

At the time t=36 seconds, the induction heating coil 16*a* is operated again at high power of approximately P=2450 W, to be precise again for the duration of 15 seconds, as before. The power is then decreased greatly again for a duration of approximately 20 seconds with weak power pulses, as before. At the time t=72 seconds, the induction heating coil 16*a* is operated for the third time at very high power of P=3450 W, to be precise again for the duration of 15 seconds, as before. After this third very high power generation or generation of energy, the induction heating coil 16*a* is operated at a low continuous power of P=300 W. This pattern of generating power or energy forms a cycle mentioned at the outset. This is repeated such that it is carried out in total twice or even three times.

The thick lines are used to illustrate the profile of the temperatures Ta and Tb over time t, wherein the temperature Ta is illustrated using dashed lines. The temperature Ta is captured by the temperature sensor 36*a* and the temperature Tb is captured by the temperature sensor 36*b*. The temperature Tb in the cooking vessel base 29 increases to approximately 85° C. during the first energy generation and then falls to slightly above 60° C. during the low energy generation. The temperature Ta increases considerably more slowly to only 40° C. according to the temperature of the goods to be cooked G and then falls slightly again.

During the second high energy generation, the temperature Tb increases to approximately 160° C., but the temperature Ta increases only to approximately 70° C. and with a slight delay. The temperatures then fall to 120° C. and 60° C., respectively, during the low energy generation.

During the third, very high energy generation, the temperature Tb increases to approximately 210° C., but the temperature Ta increases only to approximately 85° C., again with a slight delay. The temperatures then fall again during the continuously low energy generation.

According to the method mentioned at the outset, the values for the temperatures Ta and Tb, and possibly also a maximum value generated in each case shortly afterward, are captured by the evaluation apparatus 40 at the end of the respective energy generation, possibly also over their entire temporal profile, and the resulting temperature differences are calculated therefrom during the respective energy generation. These are the temperature data mentioned at the outset. The evaluation apparatus 40 transmits said data to the hob controller 18 by means of the transmitting apparatus 42. For the profile of the temperature Tb, these are 65° C., 100° C. and 90° C. Since the profile of the temperature Ta also obviously depends on the goods to be cooked G, only the temperature Tb and its temperature differences are used for the plausibility checks.

The hob controller determines the energy generated by the induction heating coil 16*a* and transmitted to the cooking vessel 27 during the triple high energy generation. Said energy is 26.2 kWsec the first time, 36.8 kWsec the second time and 51.8 kWsec the third time. If each of these values is then divided by the temperature difference on account of the energy generation between the start and end of the energy generation as a relationship or ratio, 403 Wsec/° C., 368 Wsec/° C. and 575 Wsec/° C. result for the temperature Tb. These values are stored. A plausibility range stored in the controller 18 may in this case be between 200 Wsec/° C. and 900 Wsec/° C., for example, or even between 300 Wsec/° C. and 700 Wsec/° C. Since said values are in this plausibility range, this part of the check is passed with a positive result. Alternatively, only the last temperature value, that is to say only 575 Wsec/° C., could also be used. However, this value is also distinctly in the plausibility range mentioned. The check of the triple high energy generation, which, with the three values mentioned, differs considerably from a continuous average energy generation and also makes it possible to distinguish from random generation of the energy, would then be dispensed with, however.

For the second plausibility result, the ratio of the first temporal derivative of the energy generated by the induction heating coil 16*a* to the maximum first temporal derivative of the temperature Tb at the temperature sensor 36*b* is determined as a relationship according to the invention. This is carried out by first of all determining, by observing the first temporal derivative of the temperature Tb over a period of a few seconds, for example 5 seconds in each case, the highest value for this first temporal derivative. If a value has not been exceeded again for 5 seconds, this is taken as the highest point or maximum value. The respective maximum value for the first temporal derivative of the temperature Tb here is 6° C./sec in the first high energy generation, 6.7° C./sec in the second high energy generation and 8.6° C./sec in the third high energy generation. These values can be stored. If the ratio of the first temporal derivative of the energy generated by the induction heating coil 16*a* to the first temporal derivative of the temperature Tb at the temperature sensor 36*b* is formed as a relationship according to the invention, the values of 292 Wsec/° C., 365 Wsec/° C. and 401 Wsec/° C. result here as plausibility results. A plausibility range may here be between 100 Wsec/° C. and 600 Wsec/° C., for example, with the result that the plausibility results mentioned are each in said range. This plausibility check is also positive and is therefore passed.

The change in the absolute temperature Tb at the temperature sensor 36*b* at the end of the low energy generation over a few seconds is determined as the third plausibility result, that is to say here a temperature drop of in each case 55° C. at the end of the low energy generation as the plausibility result. A plausibility range may be between +5° C. and −60° C. here, with the result that this third plausibility check is also positive and is therefore passed.

Since all three plausibility checks were therefore positive, the cooking vessel 27 with its transmitted identification is assigned to the induction heating coil 16*a*. The controller 18 can then start an automatic program for the cooking vessel 27, wherein the temperature sensor 36*a*, in particular, can be used here for temperature control. The temperature data or temperature results are then used to control the induction heating coil 16*a*.

If one of the three plausibility checks were negative, the cooking vessel 27 would not be assigned. This is indeed a strict checking benchmark, but errors can thus be avoided.

Although the cooking vessel 27' illustrated on the right in FIG. 1 can also emit its identification and temperature data, they probably indicate an unchanged temperature since the cooking vessel is not heated. The cooking vessel 27' is therefore not assigned to any induction heating coil 16, in particular is not assigned to the induction heating coil 16*a* which generated energy in order to detect a smart cooking vessel.

If it should be investigated for a further induction heating coil on the hob 13, for example the induction heating coil 16*b*, whether a smart cooking vessel is arranged above it, it is also controlled with a pattern of energy generation similar to FIG. 3. The use of the same pattern of energy generation is completely problem-free since the check is carried out here at a different time than for the induction heating coil 16*a*. If there is no smart cooking vessel above it, the controller 18 receives only the temperature data of the cooking vessel 27. However, these temperature data do not match the pattern of energy generation, but rather correspond just to the operation of the induction heating coil 16*a*. This is registered by the controller 18 and the assignment of the cooking vessel 27 is not changed and a cooking vessel is not assigned to the induction heating coil 16*b* either.

If there is a smart cooking vessel above the induction heating coil 16*b*, the controller 18 receives the temperature data of both cooking vessels 27, wherein only those data of the cooking vessel 27 above the induction heating coil 16*b* match the pattern of energy generation. If the check of the plausibilities is successful here, the corresponding assignment is carried out.

The invention claimed is:

1. A method for heating at least one cooking vessel of a plurality of cooking vessels on a hob, said hob having a plurality of heating devices, wherein:

each said heating device has a heating region, one said cooking vessel is arranged so as to cover said heating region, each said heating device is designed to generate and transmit energy for heating said cooking vessel arranged above it and for said purpose is controlled by a power supply, each said cooking vessel has a temperature sensor mounted on the base of the cooking vessel or inside the cooking vessel for collecting change in temperature on account of the transmission of energy for heating, together with an evaluation apparatus to evaluate the temporal profile of the temperature as temperature data to identify said cooking vessel, and a transmitting apparatus for transmitting said identification and temperature data, wherein said heating region of said heating device is at least partially covered by said cooking vessel, a receiving device is provided for said hob for the purpose of receiving said identification and said temperature data from one said transmitting apparatus of said cooking vessel or from any other transmitting apparatuses of any other cooking vessels on said hob or in said receiving region of said receiving device, a controller is provided for said hob, said controller receiving said identification and said temperature data from said receiving device and evaluates said identification and said temperature data with respect to information relating to a transmission of energy from said heating device, wherein said method has the following steps:

at least one said cooking vessel is arranged above one said heating region of one said heating device, at least one said heating device is controlled by said power supply in order to generate and transmit energy to said cooking vessel in a cycle, wherein a duration and/or a maximum value of said transmission of energy is/are varied in said cycle, wherein said variation in said cycle involves at least one of:

said maximum value of said transmitted energy varying over time, said duration of said transmission of energy varying, a duration between two said operations of transmitting said energy varying, or a number of said operations of transmitting said energy varying, said temperature sensor of said cooking vessel registers a change or an increase in a temperature value of said temperature on account of said transmission of energy, wherein a maximum value of said temperature value is 200° C., said evaluation apparatus of said cooking vessel evaluates the temporal profile of said temperature varying over time as the temperature data and transmits said identification and said temperature data to said receiving device by means of said transmitting apparatus, said controller has or receives said identification and said temperature data from said transmitting apparatus and said receiving device of said cooking vessel, said controller calculates:

as a first plausibility result, a relationship of said energy generated by said heating device with respect to said resulting temperature difference at said temperature sensor, wherein said relationship is a ratio calculated by dividing said energy generated by said heating device by said resulting temperature difference at said temperature sensor, wherein said first plausibility result is between 200 Wsec/° C. and 900 Wsec/° C., and as a second plausibility result, a relationship of a first derivative after time of the energy generated by said heating device with respect to a maximum first derivative after time of said temperature at said temperature sensor, the maximum first derivative after time of said temperature being between 6° C./sec and 8.6° C./sec, said first and said second plausibility results are buffered by said controller, after each cycle, a change in an absolute temperature at said temperature sensor is checked for said received temperature data and said change is buffered by said controller as a third plausibility result, said cycle of generating and transmitting energy is carried out at least twice in the same manner and said three plausibility results are each calculated and buffered during each carrying-out said operation and after each carrying-out said operation, said controller carries out a plausibility check for each of said three plausibility results, during which a check is carried out in order to determine whether said respective plausibility result is in a plausibility range predefined for said result and stored in said controller, wherein, if all three plausibility checks were positive, said cooking vessel with said identification is assigned to said heating device which previously generated and transmitted said energy, wherein, if at least one said plausibility check was negative, said cooking vessel with said identification is not assigned to said heating device and/or is not assigned to any of said heating devices, wherein said steps are carried out as a check for all said identifications and said temperature data of said cooking vessels having said temperature sensor, said evaluation apparatus and said transmitting apparatus that are received by said receiving device, and wherein, if no check of said temperature data of one said cooking vessel was positive in all three said plausibility checks during at least two of said cycles, said controller assumes that no cooking vessel having one said temperature sensor together with one said evaluation apparatus and one said transmitting apparatus has been placed on said heating device.

2. The method as claimed in claim 1, wherein, if only precisely one single check of temperature data of one said cooking vessel was positive in all three said plausibility checks during at least two said cycles, precisely one single of said cooking vessels having one said temperature sensor together with one said evaluation apparatus and one said transmitting apparatus on said heating device is assumed.

3. The method as claimed in claim 1, wherein, if a plurality of checks of said temperature data of one said cooking vessel were positive in all three said plausibility checks during at least said two cycles, a check is carried out in order to determine whether said temperature data have been received from different said cooking vessels with different said identifications, wherein a cooking vessel is not assigned to a heating device in said case, wherein, if said temperature data have been received from a single cooking vessel, said cooking vessel is assigned to said heating device.

4. The method as claimed in claim 1, wherein, if only one single check of said temperature data of one said cooking vessel was positive in all three said plausibility checks during said at least two cycles, but said associated cooking vessel has already been assigned to another said heating device, no new assignment is carried out.

5. The method as claimed in claim 1, wherein, if a plurality of said checks of said temperature data were positive in all three said plausibility checks during said at least two cycles, said cooking vessel whose temperature data have been checked and for which said plausibility checks were positive but which has already been assigned to one said heating device other than said heating device having generated and transmitted said energy, a fault is detected and each assignment of one said cooking vessel to one said heating device in said hob is deleted.

6. The method as claimed in claim 1, wherein said method is simultaneously carried out only with a single heating device of said hob, wherein, although other heating devices of said hob are operated for a purpose of generating and transmitting energy, said other heating devices are not operated according to said above-mentioned cycle.

7. The method as claimed in claim 1, wherein said method is simultaneously carried out with at least two said heating devices of said hob, wherein said generation and transmission of energy in said two heating devices is different with respect to at least one of said above-mentioned variations of said maximum value, said transmission duration, duration between two said operations or a number of said operations.

8. The method as claimed in claim 1, wherein, in addition to said transmitting apparatus, said cooking vessel also has an energy store such as a battery, a rechargeable battery or a capacitor.

9. The method as claimed in claim 1, wherein said heating device is controlled by said power supply in such a manner that energy with more than 30% of a maximum energy is generated and transmitted as high energy at least twice in one said cycle, wherein, between each process of generating said high energy, said heating device is controlled in such a manner that low energy with less than 15% of said maximum energy is generated.

10. The method as claimed in claim 9, wherein said generation of said high energy with more than 30% of said maximum energy increases after generation of said low energy in one said cycle.

11. The method as claimed in claim 10, wherein said generation of said high energy with more than 30% of said maximum energy increases by 20% to 50% in each case after generation of said low energy in one said cycle.

12. The method as claimed in claim 9, wherein a duration of generating said high energy is 5 seconds to 30 seconds.

13. The method as claimed in claim 9, wherein a duration of generating said low energy is 10 seconds to 40 seconds.

14. The method as claimed in claim 9, wherein a duration of generating said high energy is identical in each cycle.

15. The method as claimed in claim 9, wherein a duration of generating said low energy is identical in each cycle.

16. The method as claimed in claim 9, wherein a duration of generating said low energy in each cycle is 30% to 100% longer than a duration of generating said high energy.

17. The method as claimed in claim 9, wherein a duration of one said entire cycle is 40 seconds to 240 seconds.

18. The method as claimed in claim 1, wherein each said cycle is identical to an other of said cycles and there is only one single type of said cycle.

19. The method as claimed in claim 18, wherein an identity of said cycle also applies to said heating devices with a different maximum energy by said heating devices generating energy with a same energy density in each case as energy per unit area.

20. The method as claimed in claim 1, wherein said method is carried out only on those of said heating devices whose said heating region is assigned to only precisely one said cooking vessel.

21. A hob designed to carry out said method as claimed in claim 1.

22. The hob as claimed in claim 21, wherein said hob has a plurality of induction heating coils as said heating devices, wherein at least one induction heating coil is assigned to each said heating region.

* * * * *